Feb. 16, 1926.

J. HARRIS 1,573,546

INDUCTION ELECTRICITY METER

Filed June 15, 1925

INVENTOR
Jesse Harris
BY
ATTORNEY

Patented Feb. 16, 1926.

1,573,546

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION ELECTRICITY METER.

Application filed June 15, 1925. Serial No. 37,173.

*To all whom it may concern:*

Be it known that I, JESSE HARRIS, a citizen of the United States, residing at La Fayette, in the county of Tippecanoe and the State of Indiana, have invented a certain new and useful Improvement in Induction Electricity Meters, of which the following is a full, clear, concise, and exact description.

My invention relates to induction electricity meters and is of particular service in connection with watthour meters.

My invention has for its object the prevention of errors in such a meter due to temperature changes. I accomplish the object of my invention by the provision of a supplemental magnetic flux producing device having an energizing circuit whose resistance varies upon change in temperature more than the resistance of the windings of the torque producing magnet system, particularly the pressure winding, said supplemental flux producing device being arranged to have its flux follow a path that is also followed by flux set up by said magnet system.

In the preferred embodiment of the invention the supplemental magnetic flux producing device is arranged in a path for flux produced by said magnet system that shunts the meter armature, this supplemental magnetic flux producing device having an energizing circuit whose resistance increases and decreases more upon increase and decrease in temperature than the resistance of said pressure winding increases and decreases, the flux produced by said supplemental device being arranged to flow oppositely to the flux of said magnet system flowing in said path that shunts the meter armature. By this mechanism errors due to temperature effected changes in resistance in the pressure winding of the torque producing magnet system and also errors due to temperature effected changes in the dragging action of the permanent magnets may be both overcome.

Figure 1:
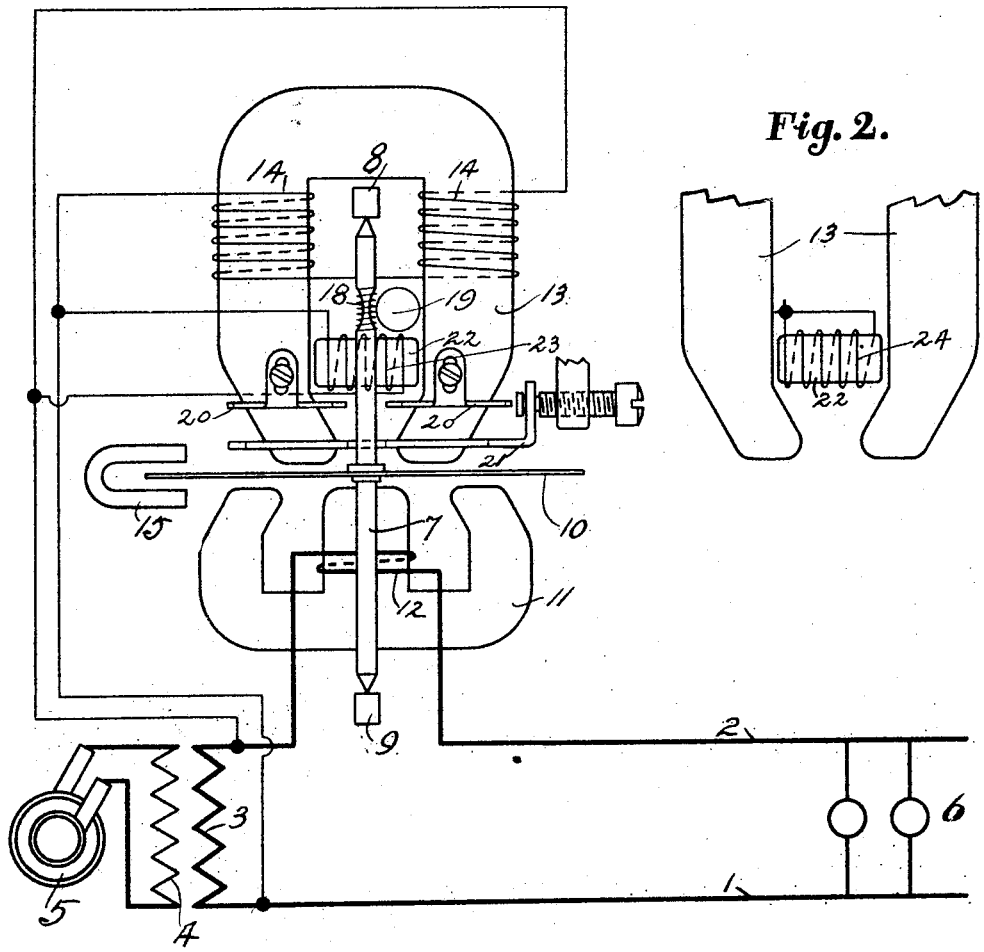
Figure 2:
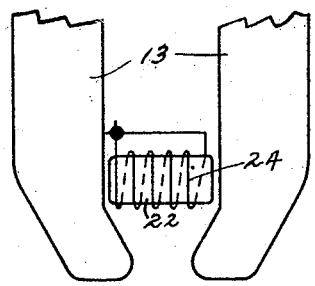

The invention will be more fully explained in connection with the accompanying drawing in which Fig. 1 is a diagrammatic view of one well known form of meter as it is preferably equipped in accordance with my invention, an alternating current system to which the meter is supplied being also diagrammatically shown; and Fig. 2 illustrates a modification.

I have illustrated transmission mains 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6. The energy consumed by the load is measured by a watt meter, usually of the induction watthour or integrating type, such a meter being illustrated in the drawing. This meter is inclusive of an upright spindle or shaft 7 suitably held in bearings 8 and 9. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E-shaped core of laminated iron 11 whose middle leg is wound by a coil 12 serially included in the main 2. The pressure magnet is inclusive of a U-shaped laminated iron core 13 whose legs are surrounded by the coils 14 which are connected in series in the same bridge between the distributing mains 1 and 2. The speed of the armature of the meter is checked by the permanent magnet 15 which embraces the peripheral portion of the disc with which it is in inductive relation. The meter parts illustrated and described constitute a meter motor whose armature 10 and spindle 7 turn proportionately to the wattage in a manner well known to those familiar with the art.

A worm 18 is provided upon the spindle 7 and is in mesh with a pinion 19 that is in driving relation with the counting train of the meter, as is well understood without the necessity of further illustration.

Quadrature relation of the magnetic fields due to the current and pressure windings is effected by means of the closed conductors 20, 20 which surround the ends of the pressure core 13 and are adjustable for calibration along these core ends to regulate the secondary relation of these conductors with the pressure winding 14. The conductors 20, 20 may be in the nature of non-magnetic metallic plates with holes therethrough through which the ends of the core 13 are passed. A non-magnetic metallic plate 21 has two holes formed therethrough through which the ends of core 13 are also passed, to provide closed conductors that compensate for friction. This plate is adjustable for calibration crosswise of the limbs of the core 13.

The temperature effected changes in the torque of the meter are in a direction to assist in the correction of the errors at the damping magnet, but do not proceed far enough.

I provide a laminated iron core 22 between the arms of the U shaped pressure core 13, thereby establishing a magnetic shunt for the greater part of the flux of the pressure coils 14, and upon this shunt core is placed a coil 23 in the arrangement shown in Fig. 1 or 24 in the arrangemnt shown in Fig. 2. In Fig. 1 the coil 23 is shown in bridge of the mains 1 and 2. In Fig. 2 the coil 24 is in secondary relation to the pressure winding 14. These coils are of insulated wire having a high temperature coefficient of resistance such as iron, the coils being so directed as to furnish flux that opposes the passage of the pressure winding flux between the arms of the core 13.

The meter is calibrated as usual at some selected mean temperature to correctly register various loads. When a meter so calibrated is subject to a higher temperature, the damping magnet will become less effective due to the reduction of its magnetic permeability as will also the torque produced by the torque producing magnet system of the meter and to an extent to cause the meter to run faster than it should for correct registration. Conversely if the temperature is reduced below that at which the meter was initially calibrated the meter will run slower than it should. The correcting flux due to the winding 23 or the winding 24, opposing, as it does, the passage of the flux produced by the magnet system between the arms of the core 13 will so modify the torque producing flux which passes through the armature from the pressure core 13 as to cause the meter to register the various loads at the various temperatures correctly.

Having thus described my invention, I claim:

1. An induction electricity meter including a rotating induction motor having a torque producing magnet system provided with current and pressure windings in inductive relation to the motor armature and employing a closed metallic conductor upon the rotating element of the motor and a damping magnet in inductive relation to said closed conductor, and a supplemental magnetic flux producing device having a magnetizable core arranged in a path for flux produced by said magnet system that shunts the meter armature and having an energizing circuit whose resistance increases and decreases more upon increase and decrease in temperature than the resistance of said pressure winding increases and decreases, said supplemental flux producing device being arranged to have its flux flow oppositely to the flux of said magnet system flowing in said path that shunts the armature to reduce the torque effecting flux upon increase in temperature and to increase the torque effecting flux upon reduction in temperature to compensate for temeparture effected changes in the dragging action of the damping magnet.

2. An induction electricity meter including a torque producing magnet system provided with current and pressure windings in inductive relation to the motor armature, and a supplemental magnetic flux producing device having a magnetizable core arranged in a path for flux produced by said magnet system that shunts the meter armature and having an energizing circuit whose resistance increases and decreases more upon increase and decrease in temperature than the resistance of said pressure winding increases and decreases, said supplemental flux producing device being arranged to have its flux flow oppositely to the flux of said magnet system flowing in said path that shunts the armature to reduce the torque effecting flux upon increase in temperature and to increase the torque effecting flux upon reduction in temperature.

3. An induction electricity meter including a torque producing magnet system provided with current and pressure windings in inductive relation to the motor armature, and a supplemental magnetic flux producing device having a magnetizable core arranged in a path for flux produced by said magnet system that shunts the meter armature and having an energizing circuit whose resistance increases and decreases more upon increase and decrease in temperature than the resistance of said pressure winding increases and decreases, said supplemental flux producing device being arranged to have its flux flow oppositely to the flux of said magnet system flowing in said path that shunts the armature.

In witness whereof, I hereunto subscribe my name.

JESSE HARRIS,